United States Patent [19]
Regnault

[11] 3,872,370
[45] Mar. 18, 1975

[54] HIGH-VOLTAGE D.C. GENERATOR, SPECIALLY FOR ENERGIZING AN ELECTROSTATIC APPARATUS

[75] Inventor: Alain Regnault, Noailles, France

[73] Assignee: Redelec, Societe a responsabilite limitee, Moulin de Pierre, France

[22] Filed: Mar. 2, 1973

[21] Appl. No.: 337,569

[30] Foreign Application Priority Data
Mar. 3, 1972 France .............................. 72.07505
Sept. 28, 1972 France .............................. 72.34310

[52] U.S. Cl. ...................................... 317/3, 321/15
[51] Int. Cl. ............................................ B05b 5/00
[58] Field of Search .................... 317/3, 256; 321/15

[56] References Cited
UNITED STATES PATENTS

| | | | |
|---|---|---|---|
| 3,584,287 | 6/1971 | Binoche ................................ | 321/15 |
| 3,599,038 | 8/1971 | Skidmore .......................... | 321/15 X |
| 3,714,530 | 1/1973 | Wells et al. ....................... | 321/15 X |
| 3,731,145 | 5/1973 | Sendy ................................ | 321/15 X |

Primary Examiner—William H. Beha, Jr.

[57] ABSTRACT

This invention relates to a high-voltage d.c. generator capable of at least a few tens of kilovolts for energizing an electrostatic apparatus of the type comprising a charge electrode, such as paint spraying guns, powdering apparatus, electrostatic filter means. This generator comprises a self-oscillating circuit producing an alternating current having a frequency of at least 20,000 Hz. A single transformer is located in close vicinity of this self-oscillating circuit. Its primary winding is connected to the output of the self-oscillating circuit. An adder-rectifier consisting essentially of miniaturized capacitors of very low values, and of miniaturized solid-state diodes, having very low self-capacities, is incorporated in the electrostatic apparatus, very close to its charge electrode. The output of the adder-rectifier is connected directly to the charge electrode. A flexible coaxial cable of predetermined length is disposed for connecting the secondary winding of the transformer directly to the input of the adder-rectifier.

10 Claims, 10 Drawing Figures

HIGH-VOLTAGE D.C. GENERATOR, SPECIALLY FOR ENERGIZING AN ELECTROSTATIC APPARATUS

BACKGROUND OF THE INVENTION

1. Field Of The Invention

This invention relates to a high-voltage d.c. generator, capable of several tens or hundreds of kilovolts, for energizing the charge electrode of an electrostatic spraying, powdering, filtering or apparatus. electrostatically operating apparatus, specially an electrostatic paint spraying apparatus

2. Description Of The Prior Art

The high-voltage generators utilized up to now for the above-defined applications are connected to the charge electrode of the apparatus to be supplied therefrom through a cable which is to be insulated for at least several tens of kilovolts, and consequently is necessarily heavy, bulky, rigid and expensive. But, in addition, such cable constitutes a high electric capacity, of which the discharge, in case of accidental contact between the charge electrode and grounded object or person, may be the cause of severe damages and/or injuries.

These problems are particularly important in the case of high-voltage generators intended for supplying electrostatic paint spraying apparatus and electrostatic powdering apparatus; in these cases the generator has to deliver a current of the order of 50 micro-amperes under voltages of 60 to 100 kilovolts, which corresponds in any case to a relatively low electric power.

A high-voltage direct-current generator for an electrostatic paint spraying apparatus is already known, which comprises high-frequency high-frequency a.c. generator, supplying through a first transformer one end of a cable, of which the other end is connected via a second transformer to a voltage adder-rectifier of known cascade type, which is mounted together with the second transformer in the spraying cabin, in close proximity of the spraying head, the other above-listed elements of said generator being disposed externally of this cabin. This generating plant cannot be used specially for an electrostatic spraying gun because the assembly comprising the adder-rectifier and the second transformer is too bulky and heavy to be incorporated in the gun proper; thus, if this gun has to be moved about, it must also be connected to the output of the adder-rectifier by means of a flexible cable insulated for high-voltage currents.

SUMMARY OF THE INVENTION

A first object of this invention is to provide an improved form of a high-voltage d.c. generator for enerzing an electrostatic apparatus, said generator comprising a high-frequency a.c. generator with an output transformer, and a cable connecting said output transformer to a voltage adder-rectifier, located at least in the vicinity of the electrostatic apparatus this adder-rectifier being further adapted to be miniaturized sufficiently to permit its incorporation in an electrostatic spraying or powdering gun in which it is arranged as close as possible to the charge electrode. This miniaturization of the adder-rectifier results in a very considerable reduction in the total electric capacity connected directly to the charge electrode, of which the accidental discharge is thus no more a source of danger, as explained hereinabove. Moreover an electrostatic plant or apparatus supplied from such an improved form of generator is free of any flexible cable insulated for high-voltage even when this plant or apparatus comprises a movable gun. In fact the only cable provided in this plant or apparatus is the above-mentioned cable conveying the high-frequency voltage, which amounts only from 2 to 4 kilovolts; this is a light and flexible cable of relatively reduced cross-sectional dimensions, which is free of the above mentioned very inconvenient features of the cables insulated for several tens of kilovolts.

A second object of this invention is to provide a high-voltage d.c. generator comprising an a.c. generator delivering a current having a frequency of at least 20,000 Hz and preferably from 40,000 to 50,000 Hz, a single transformer placed adjacent this a.c. generator, and connected to its output a cable having one end connected to said transformer and an adder-rectifier directly connected to the other end of said cable, this adder-rectifier consisting only of miniature capacitors, of very low values, and of miniature solid-state diodes, having very low self-capacities, and being incorporated in the electrostatic apparatus, as close as possible to its charge electrode, specially in the barrel of the spraying gun.

By utilizing for the voltage adder-rectifier of this generator silicon diodes of very small dimensions, and by also providing said adder-rectifier with capacitors having low capacity values, consistent with the high frequency-at least 20,000 Hz- of the a.c. voltage supplied to said adder-rectifier, it is possible to reduce the total capacity of this adder-rectifier in such proportion that the accidental discharge of this total capacity is practically innocuous.

In a first embodiment of this invention, the voltage adder-rectifier of the high voltage generator is of the well known type referred to as a "cascade adder-rectifier"; moreover, the series of capacitors of the cascade adder-rectifier are printed on a printed circuit plate comprising two or more layers, or on two printed circuit plates, one plate for the even capacitor series and the other plate for the odd capacitor series, the diodes being soldered directly to the capacitor plates and the assembly being finally insulated for high voltage protection by coating the same with a moldable resin. That results in facilitating the manufacturing and reducing the total cost of the adder-rectifier incorporated in this generator, since the series of capacitors thereof can be so manufactured in a single operation; furthermore, the printed circuit plates utilized to this end may advantageously be used as supports for the other components of the adder-rectifier.

Another advantageous feature of this invention consists of using, as a cable connecting the a.c. generator to the adder-rectifier, a coaxial cable, the braid of which is connected at its end close to the a.c. generator and transformer to the ground and at its opposite end to the frame of the electrostatic apparatus, one of the input terminals of the adder-rectifier being also connected to the frame of the electrostatic apparatus via a capacitor for permitting the return of the load alternating current, while preventing the return of the high-voltage direct current. Moreover a self-inductance may be inserted between the ground and the central conductor of the coaxial cable, at the cable end adjacent to the a.c. generator and transformer, the value of this self-inductance being selected to compensate the capacity of said cable and to tune the circuit assembly comprising the a.c. generator, the transformer and the cable, to the desired high frequency, a capacitor being further connected in series with said self-inductance for blocking the direct component of the return current.

A further advantageous feature of this invention consists in providing a first resistor inserted between the ground and the respective terminal of the secondary winding of the transformer, and in further providing means for regulating the high voltage produced by the generator, from the d.c. component of the voltage across said first resistor.

For utilizing the d.c. component of the voltage across the said first resistor to regulate the high voltage produced by the generator, it is possible to shunt the a.c. component of said voltage by connecting a capacitor in parallel to said first resistor; however, for certain applications, the delay which, with this arrangement, will unavoidably affect the regulation, may be considered as unacceptable. For such applications, a regulation substantially free of inertia may be obtained by means of the following arrangement, which embodies another feature of this invention: The regulating means comprises a differential amplifier having its positive and negative terminals connected to the common terminal of the first resistor and of the secondary winding of the transformer, respectively via a second resistor and a series-type LC circuit tuned to the frequency of the alternating current produced by the a.c. generator. With this specific arrangement, the output signal of the differential amplifier is free of any a.c. component.

However, the provision of a cascade adder-rectifier in the high-voltage d.c. generator of this invention is attended by the following drawback: in each one of the series stages constituting a cascade adder-rectifier the factor by which the input voltage of the stage is multiplied therein is reduced by the self-capacities of the diodes of the stage, in a proportion which increases if the capacity values of the capacitors of the same stage are reduced, specially down to the order of magnitude of the self-capacities of said diodes, for the safety reasons mentioned hereinabove. In other words, the additional voltage "gain" obtained by adding an additional stage to an adder-rectifier comprising $n$ stages in cascade decreases rapidly as $n$ increases; this could be avoided only by selecting for the capacitors of each stage, capacity values relatively high in comparison with the self-capacities of the diodes of the same stage, which would not permit of reducing the total capacity of the adder-rectifier and obtaining thereby the highest possible degree of safety, together with a sufficient miniaturization of said adder-rectifier, to permit its incorporation in the electrostatic spraying or powdering gun.

This drawback, which appears more particularly when the generator of this invention is intended for producing very high d.c. voltages, can be coped with in a second embodiment of this invention, wherein the voltage adder-rectifier is of the parallel-connected type, with the various stages of the said adder-rectifier being supplied in parallel.

In this second embodiment of the invention the factor whereby each stage of the parallel-connected adder-rectifier multiplies its input voltage, is practically independent of the rank of said stage, so that the high voltage produced at the output of said adder-rectifier is substantially proportional to the number of stages thereof. Each stage of the parallel-connected adder-rectifier may thus be constructed with capacitors having capacity values substantially of the same order of magnitude as the very low self-capacities of the diodes of said stage. On the other hand, whereas the various stages of a cascade adder-rectifier receive different currents therethrough and consequently their respective capacitors must have different capacity values selected preferably according to an arithmetical progression, all the preferably identical-stages of an adder-rectifier of the parallel type receive each the same current, so that their respective capacitors may be selected with substantially a same rated capacity, of a relatively low value, which is an advantageous feature from both points of view: manufacturing simplification and safety improvement.

The objects, characteristics and advantages of this invention will be more fully understood from the following description of a high voltage d.c. generator, with reference the the accompanying drawings, in which:

DESCRIPTION OF THE PREFERRED EMBODIMENTS

Figure 1:
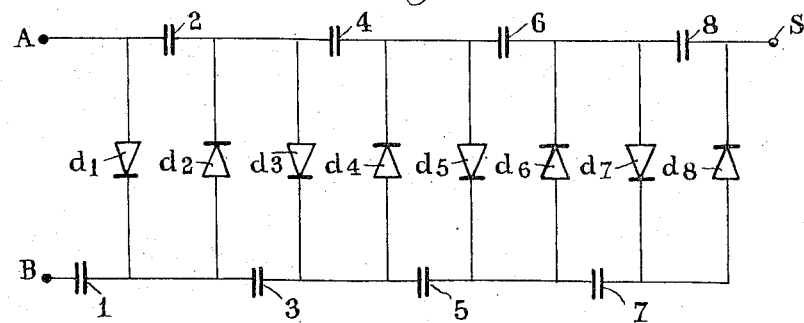
FIG. 1 is the wiring diagram of a cascade adder-rectifier.

The wiring diagram of a typical cascade adder-rectifier is shown in FIG. 1. A supply a.c. low voltage is applied, for instance from the mains, to the input terminals A and B of said adder-rectifier. The high-voltage d.c. output terminal is designated by the reference letter S. This adder-rectifier comprises two series of capacitors, i.e., an even series and an odd series, as shown in FIG. 1, in which the capacitors are numbered 1 to 8. A set of diodes $d_1$ to $d_8$ permits of charging these capacitors 1 to 8 in parallel with the supply a.c. voltage and to discharge them in series through a load (not shown), connected to the output terminal S.

The adder-rectifier shown in FIG. 1 has four stages, each stage comprising one odd capacitor, one even capacitor and two diodes. The output voltage would be equal to the peak-to-peak input voltage multiplied by the number $n$ of stages, if the efficiency of each stage is assumed to be 100 percent.

The supply current fed to the input terminals A and B is equal to $n$ times the high-voltage output current, but the current flowing through the second-stage capacitors (i.e., those of the stage following immediately the input stage) is equal to $(n - 1)$ times said output current, and so forth; in the $n^{th}$-stage capacitors only high-voltage output current flows. Therefore, according to a feature of the present invention, the capacity values of the respective stage capacitors are selected according to an arithmetical progression, whereby the same operation conditions are obtained for each stage. This advantageous designing is not the only possible but it is to be preferred for obtaining the best possible efficiency for a given total surface area of the capacitor plates. This designing of the capacitor plates is particularly advantageous when printed-circuit capacitors are used, for it permits of reducing the over-all dimensions of the adder-rectifier. Moreover, this designing of the capacitor plates permits of minimizing the total capacity of the adder-rectifier to improve the safety of operation of the apparatus in which it is incorporated. When the adder-rectifier of FIG. 1 is supplied with an a.c. voltage having a frequency of the order of 40,000 to 50,000 Hz, and in any case not lower than 20,000 Hz, its last or output stage has to comprise capacities having each a value of only about 5 picofarads for obtaining the delivery of an output current of the order of 50 microamperes under 60 kilovolts.

A capacitor of this very low capacity value may be obtained by providing a metal plate having a surface area of the order of 0.8 sq. cm. on a printed-circuit plate of epoxy glass having a thickness of 0.6 mm. The a.c. voltage supplied to the adder-rectifier may be of the order of 5 to 10 kilovolts. These figures show that it is possible to obtain economically the series of capacitors of the adder-rectifier of FIG. 1 on one or a plurality of printed circuit plates or reduced dimensions.

Figure 2:
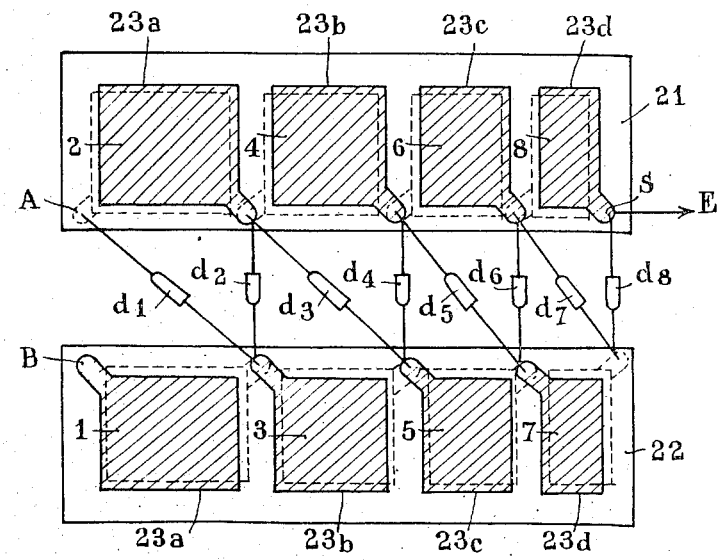
FIG. 2 is a plane view of a four-stage cascade adder-rectifier, adapted to be incorporated in an electrostatic paint spraying gun.

FIG. 2 illustrates a typical embodiment of a four-stage adder-rectifier of which the two series of capacitors are formed on a pair of printed circuit plates 21 and 22. Plate 21 comprises four capacitors 2, 4, 6 and 8 of which the first plates 23a, 23b, 23c and 23d consist of copper deposits on the upper face of said plate 21, which are shown in the form of hatched rectangles in FIG. 2, these rectangles having respective areas of stepped values, respectively proportional to the decreasing numbers 4, 3, 2 and 1. The second plates of these capacitors are deposited on the lower face of plate 21; these second plates are shown in the form of dotted rectangles, somewhat shifted in relation to the first plate hatched rectangles to facilitate the understanding of the structure.

Each capacitor plate comprises an integral extension permitting of soldering a pair of diodes thereto, so that, for instance, the lugs of diodes $d_2$ and $d_3$ put at the same potential the first plate of capacitor 2 and the second plate of the next capacitor in the same series, i.e., capacitor 4.

Figure 3:
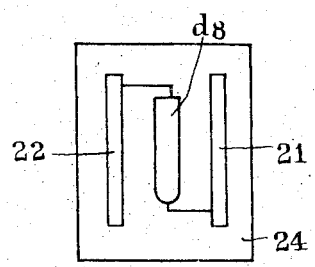
FIGS. 3 and 4 illustrate diagrammatically a more compact embodiment of the adder-rectifier of FIG. 2.
Figure 4:
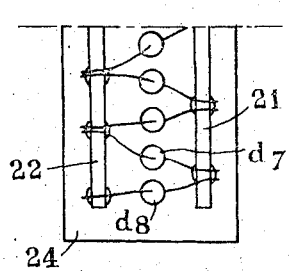

In order to improve the compactness of the adder-rectifier of FIG. 2 the lugs of said diodes $d_1$ to $d_8$ may be bent in order to bring the two printed circuit plates 21 and 22 in two parallel planes, these diodes $d_1$ to $d_8$ being positioned between these circuits 21 and 22. FIGS. 3 and 4 illustrate this arrangement in end view and plane view, respectively. The assembly may be molded in a block 24 of a moldable resin or resin compound to constitute a compact, parallelipipedic assembly or unit.

Other arrangements of the capacitor plates on the printed circuit plates and of the diodes in relation to said capacitor plates may be used without departing from the scope of this invention, as will readily occur to those conversant with the art.

Figure 5:
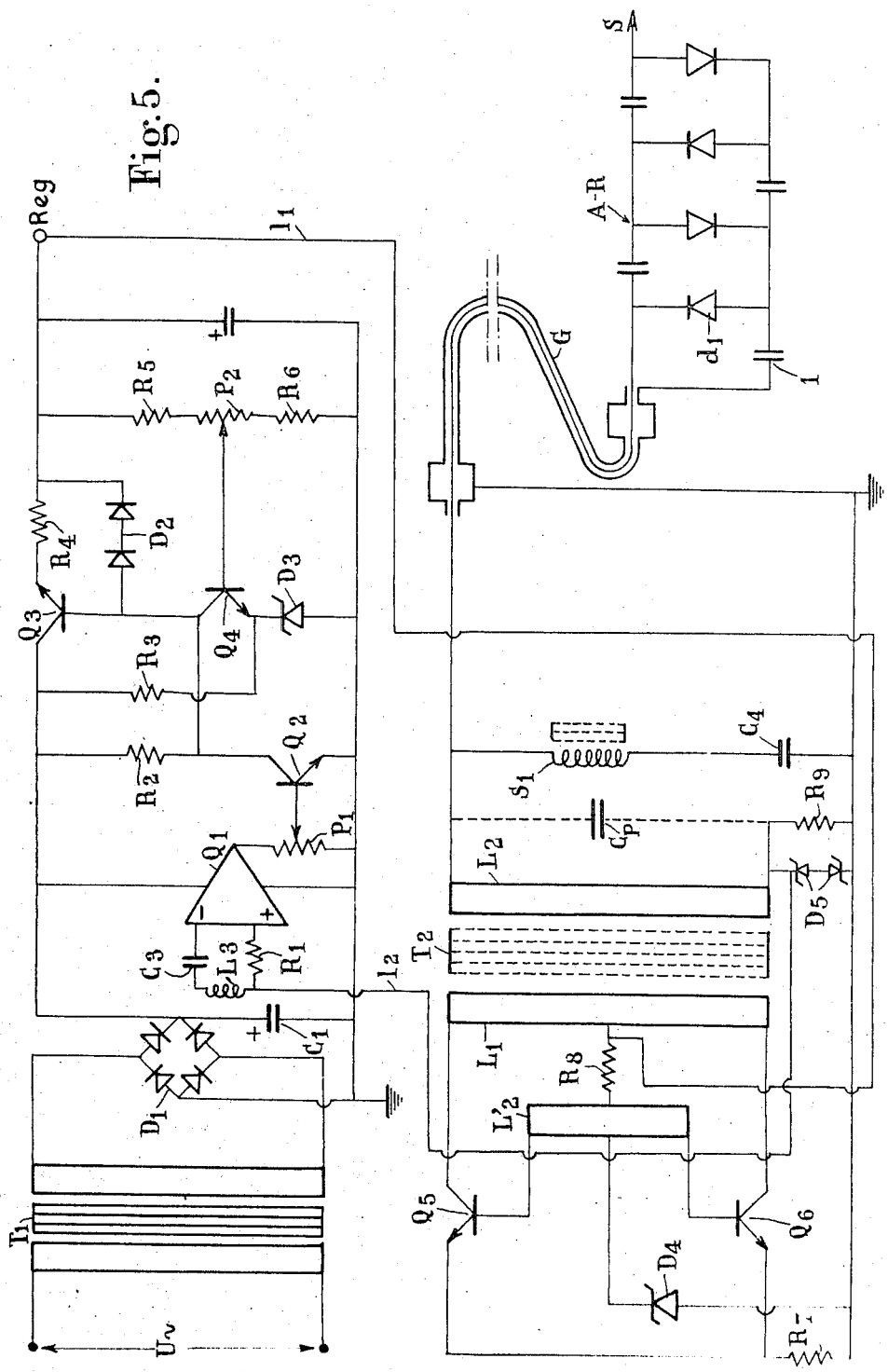
FIG. 5 is the complete wiring diagram of a high-voltage d.c. generator comprising a cascade adder-rectifier.

FIG. 5 illustrates the wiring diagram of a preferred embodiment of the high-voltage d.c. generator of this invention.

A supply transformer $T_1$ is connected to a suitable low a.c. voltage source, such as the mains; a diode bridge $D_1$ and a capacitor $C_1$ are connected to said transformer $T_1$ to produce a rectified and filtered current.

The generator of FIG. 5 further comprises a conventional series voltage regulator of which the detailed structure and mode of operation are well known in the art and are without the scope of this invention; this regulator comprises essentially five resistors $R_2$, $R_3$, $R_4$, $R_5$ and $R_6$, a potentiometer $P_2$, three transistors $Q_2$, $Q_3$ and $Q_4$, and two diodes $D_2$ and $D_3$; the high-voltage direct current supplied by the generator of FIG. 5 is adjustable by means of said potentiometer $P_2$.

The regulation voltage obtained at terminal Reg is transmitted via a conductor $l_1$ to a self-oscillating circuit comprising essentially a pair of transistors $Q_5$, $Q_6$, a pair of resistors $R_7$, $R_8$, a diode $D_4$ and a transformer $T_2$. The latter comprises a primary winding $L_1$, a secondary winding $L_2$ and a reaction winding $L_2'$. This transformer is of the conventional symmetric type, and the said self-oscillating circuit is dimensioned to produce a sine voltage having a frequency of 20 to 50 kHz across the secondary winding $L_2$ of transformer $T_2$.

The frequency of this sine voltage depends notably on the self-inductance and the capacity of the circuit supplied with current from said self-oscillating circuit, and more particularly of the transformer $T_2$ and coaxial cable G connected to the secondary winding $L_2$ of said transformer $T_2$. If L and C are the values of the self-inductance and capacity, respectively, of said circuit, the resonance frequency $F_0$ of the self-oscillating circuit may be expressed as follows:

$$F_0 = 1/2 \pi \ \sqrt{L\,C}$$

Since the self-inductance and the stray capacity CP of transformer $T_2$, as well as the capacity of cable G, are not to be selected completely freely, there is provided, according to another feature of this invention, a self-inductance $S_1$ for compensating the capacity of said coaxial cable G, so as to give the desired value to the product L. C and therefore to the frequency $F_0$. Consequently with this self-inductance $S_1$ it is possible to energize an adder-rectifier A-R (FIG. 5) similar to the adder-rectifiers of FIGS. 1 to 4, through said coaxial cable G, with a current having the desired frequency, while obtaining a satisfactory efficiency.

According to still another feature of this invention, the braid of coaxial cable G is connected to a capacitor 1 of adder-rectifier A-R and its central conductor is connected to the first diode $d_1$ of A-R.

With this arrangement the direct current delivered by the high-voltage generator can flow back to the adder-rectifier A-R neither through the cable braid, since it is blocked by the capacitor 1, nor through the self-inductance $S_1$, since it is blocked by a capacitor $C_4$ mounted in series with $S_1$. Therefore, the current can only return through a resistor $R_9$, connected in series with the secondary winding $L_2$ of transformer $T_2$. This resistor $R_9$ is protected together with the regulating means associated therewith, against possible overcurrents, caused for instance by an arcing, by a pair of Zener diodes $D_5$ mounted in opposition. A differential amplifier $Q_1$ receives on its + and − inputs the voltage across resistance $R_9$ via a conductor $l_2$. This voltage is fed to its + (positive) input terminal through a resistor $R_1$ and to its − (negative) input terminal through a self-inductance $L_3$ and a capacitor $C_3$. This self-inductance $L_3$ and the capacitor $C_3$ associated therewith are so dimensioned that only the a.c. component of frequency $F_0$ of said voltage across $R_9$ reaches the negative input terminal − of $Q_1$. Consequently, at the output of $Q_1$ only the direct component of the input voltage, multiplied by the gain of $Q_1$, is fed to potentiometer $P_1$. The function of this potentiometer $P_1$ is to permit the adjustment of the current value beyond which transistor $Q_2$ becomes conducting and brings the base of transistor $Q_3$ to ground potential, thus reducing the regulating voltage delivered by the terminal Reg to the self-oscillating circuit.

When the generator illustrated in FIG. 5 is utilized for supplying current to a movable spraying gun, the adder-rectifier A-R, miniaturized as shown in FIGS. 2 or 3, 4, is incorporated directly in the barrel of the gun, as close as possible to the charge electrode of said gun, and the incorporated adder-rectifier is connected through the coaxial cable G to the other circuits means of the generator, which are mounted at a fixed location.

A high-voltage generator embodying the above-mentioned features of this invention, may be used for supplying high-voltage current to electrostatic paint spraying guns, as well as to electrostatic powdering guns and, generally, to all apparatus utilizing a d.c. high-voltage, specially for producing an electrostatic effect. It may also be utilized for supplying electron tubes or other apparatus and devices currently used in electronic applications.

Figure 6:
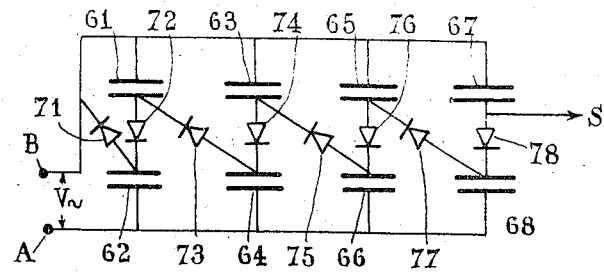
FIG. 6 is a wiring diagram of a parallel-connected adder-rectifier.

FIG. 6 is the wiring diagram of a parallel-connected adder-rectifier. The first stage of this adder-rectifier comprises capacitors 61 and 62, and diodes 71 and 72; the second stage comprises capacitors 63 and 64, and diodes 73 and 74, and so forth for the following stages. An alternating supply current is fed to its input terminals A and B, and a d.c. high-voltage is obtained at the output terminal S. Each stage is fed in parallel. The voltage with which the stage capacitors 61, 63, 65 and 67 of the odd series are charged increases with the stage rank.

Let V be the alternating peak-to-peak supply voltage and $v$ the voltage loss per stage; the odd-numbered capacitor of the K-rank stage is charged with a direct current voltage K $(V - v)$. The lower the capacity of the stage capacitors, the higher the ripple ratio of this direct current voltage, for a predetermined intensity of the output current. When an adder-rectifier of the type illustrated in FIG. 6 is incorporated in a d.c. high voltage generator for electrostatic paint spraying and, more generally, for all applications wherein a corona effect is desired at the end of a point, such a high ripple ratio appears to be rather advantageous if the ripple frequencies are of the order of 20 to 70 kHz.

Figure 7:
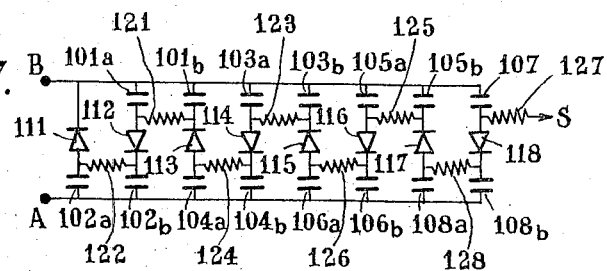
FIG. 7 is a wiring diagram of an adder-rectifier of the same type as that shown in FIG. 6, but provided with diode protecting resistors.

FIG. 7 is the wiring diagram of an adder-rectifier of same type as that of FIG. 6, but wherein each stage is divided into two sub-stages. Each capacitor of the diagram of FIG. 6 is replaced in this case by a pair of capacitors brought to the same potential and having each a capacity value equal to half that of the single capacitor replaced thereby. Thus each half-stage consists of two capacitor and one diode, such as: 101a, 102b and 112; 103a, 104b and 114. Only the first stage comprises but one diode 111 and a single capacitor 102a. The plates of the capacitors of two adjacent half-stages which must have the same potential are interconnected by one of resistors 121 to 126 and 128. Thus, for instance, the capacitors 105a and 105b have their high-voltage plates interconnected by resistor 125.

It was experienced that this mounting efficiently eliminates abnormal current surges and thus protect the diodes 111 to 118. This permits to use silicon diodes, which are more fragile than the selenium diodes currently used in non-miniaturized adder-rectifiers. On the other hand, because it limits the charge transfers between the half-stages, this mounting facilitates the regulation of the output current.

To back up the effect of resistors 121 to 126 and 128, a resistor 127 is connected to the output S, its essential purpose being to protect the adder-rectifier against return currents passing between a charged member and the discharged adder-rectifier.

Figure 8:
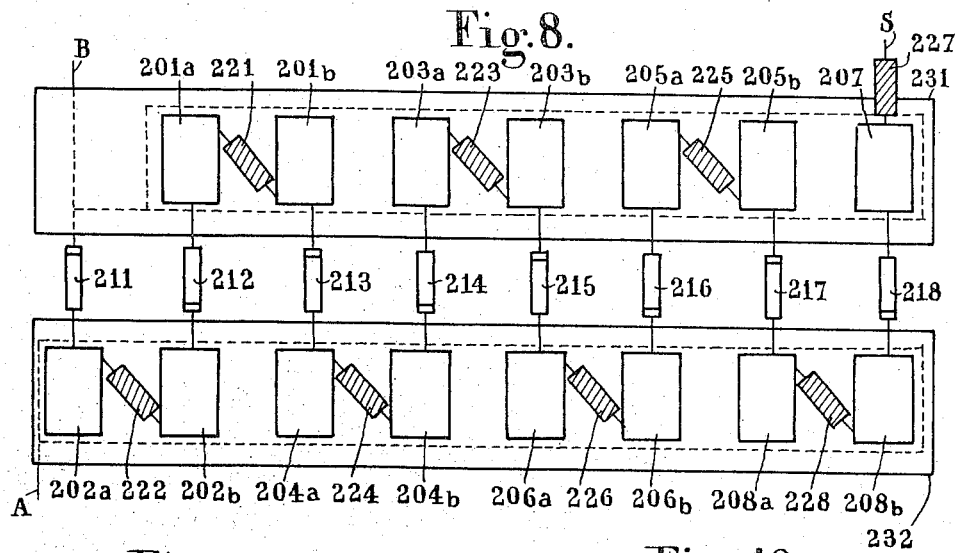
FIG. 8 is a plane view of a four-stage adder-rectifier of the parallel-connected type, adapted to be incorporated in an electrostatic paint spraying gun.

FIG. 8 illustrates a typical miniaturized embodiment of the adder-rectifier of FIG. 7.

The two series of capacitors, respectively odd and even series, are each formed on a printed circuit plate 231 for the odd-rank capacitors, and 232 for the even-rank capacitors. Each double-face printed circuit plate comprises:

a. on its lower face, a single plate, common to all capacitors of the relevant series, said common capacitor plate being represented in the form of a dash-line rectangle, and being connected to input terminal A or B;

b. on its upper face, as many metal plates as there are capacitors in the relevant series; these capacitor plates are represented in the form of thick-line rectangles and numbered 201a, 201b or 202a, 202b, etc., up to 208a, 208b; they correspond to the capacitors of similar designation 101a, 101b . . . , respectively of FIG. 7.

Diodes 211 to 218 and resistors 221 to 228, corresponding respectively to the components 111 to 118 and 121 to 128 of FIG. 7, are soldered to said capacitor plates 201a to 208b.

A nine-stage adder-rectifier of this type was constructed on 0.16 mm - thick double-face printed circuit plates. Each capacitor had a capacity of 0.95 picofarad. Thus, the capacitor of each stage in the equivalent circuit of FIG. 6 had a capacity of 1.9 picofarad. Resistors 221 to 226 and 228 had a value of 5 Megohms each, and the output resistor 227 had a value of 15 Megohms. The high frequency current was supplied to this adder-rectifier by means of a 3-meter long coaxial cable G as illustrate in FIG. 5; the frequency of the self-oscillating circuit was 50,000 Hz and the effective value of the voltage transmitted to the adder-rectifier was of the order of 3 kilovolts.

The best results were obtained by using for each diode 211 to 218 two series-connected diodes of the silicon type, having a maximum rated voltage of 10 kilovolts. In general, to reduce as much as possible the self-capacity of each diode, these diodes should preferably be operated under a voltage corresponding to half their maximum rated voltage. The selected diodes must of course have the lowest possible self-capacity value, consistent with their manufacturing process.

The nine-stage adder-rectifier thus constructed was capable of delivering a 50 microampere current under a 50 kilovolts d.c. voltage. Regulation means of the type previously described permitted of limiting the short-circuit current to 80 microamperes.

Figure 9:
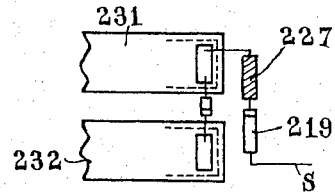
FIG. 9 illustrates a modified embodiment of the adder-rectifier of FIG. 8.

FIG. 9 illustrates a modification of the high-voltage output of the adder-rectifier of FIG. 8. If the protection against return currents passing between a charged member and the discharged adder-rectifier, when the latter is no more energized, which is provided by the resistor 227 of FIG. 8 appears to be insufficient, it is possible to insert in series with this resistor 227 a diode 219, of which the maximum rated voltage should be adapted to the voltage against which the protection is required.

Figure 10:
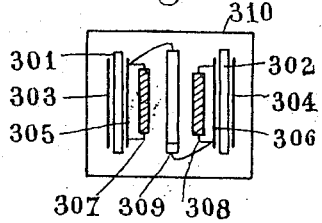
FIG. 10 is an end view of a more compact embodiment of the adder-rectifier of FIG. 8.

FIG. 10 is an end view of an adder-rectifier obtained by folding the device of FIG. 8, then molding same in a moldable resin to form a compact block.

The two printed circuit plates 301 and 302 are disposed in parallel relationship; the external plates 303 and 304 are the common capacitor plates receiving the high frequency supply current, whereas the internal plates 305 and 306 are the high-voltage capacitor plates, to which the resistors 307 and 308 as well as the diodes 309 are soldered. This assembly is embedded and molded in a moldable resin or resin compound to form a parallelipipedic block 310.

The nine-stage adder-rectifier mentioned in the foregoing was molded in this way into a unitary block having a cross-section of 30 × 30 mm and a length of 110 mm; its weight was 170 grams.

If the adder-rectifier of FIG. 7 is to be designed for very high voltage values, such as 100 kilovolts, two or more printed circuit plates may be provided for each series of capacitors, the dielectric thickness of these plates being selected with stepped values, increasing with the charging voltage of the relevant capacitors.

Due to its reduced over-all dimensions and low cost, a d.c. high-voltage generator having the features of this invention may be used for feeding apparatus for electrostatical paint spraying or electrostatical powdering and in general for energizing any apparatus for which a source delivering currents of the order of a few tens or a few hundreds of microamperes under a d.c. voltage of a few tens or hundreds of kilovolts, is required. A high degree of safety in case of disruptive discharge results from the very low total capacity of said high voltage generator.

Various modifications may be brought to the specific embodiments of the invention which have been described and illustrated herein by way of example, without departing however from the scope of the invention as set forth in the appended claims, as will readily occur to those conversant with the art.

What I claim as new is:

1. A high-voltage d.c. generator capable of at least a few tens of kilovolts, for energizing an electrostatic apparatus having a charge electrode, specially an electrostatic paint spraying apparatus, and electrostatic powdering apparatus, an electrostatic filtering apparatus, and the like, said generator comprising a self-oscillating circuit producing an alternating current having a frequency of at least 20,000 Hz, a single transformer located in the vicinity of said self-oscillating circuit and having a primary winding connected to the output of said self-oscillating circuit, and a secondary winding, at least one dielectric plate having deposited on both faces a plurality of conductive layers forming the respective plates of miniaturized capacitors of very low values, another plurality of miniaturized solid-state diodes, having very low self-capacities, said diodes being directly soldered to said capacitor plates to form an adder-rectifier of the type comprising a number of identical stages connected in parallel to one another, which adder-rectifier is embedded in a block of molded resin or resin compound and is incorporated in the electrostatic apparatus in a very close relationship to its charge electrode, the output of said adder-rectifier being connected directly to said charge electrode, and a flexible coaxial cable having a predetermined length, said cable connecting the secondary winding of said transformer directly to the input of said adder-rectifier.

2. A generator as set forth in claim 1, wherein the cable connecting the secondary winding of said transformer to the input of said adder-rectifier is a coaxial cable having a central conductor and a conducting braid surrounding said central conductor, said braid being grounded at the end of said cable which is connected to the secondary winding of said transformer, and being connected to the frame of the electrostatic apparatus at the other end of said cable, one of the input terminals of said adder-rectifier being also connected to said frame of the electrostatic apparatus through a capacitor.

3. A generator as set forth in claim 2, wherein a self-inductance connected in series with a capacitor is inserted between the ground and the end of the central conductor of said coaxial cable which is connected to the secondary winding of said transformer, the value of said self-inductance being selected to tune the circuit comprising said self-oscillating circuit, said transformer and said coaxial cable at a desired high frequency of at least 20,000 Hz.

4. A generator as set forth in claim 1, wherein a first resistor is inserted between the ground and one end of the secondary winding of said transformer, and means are provided for regulating the high frequency voltage produced by said self-oscillating circuit from the d.c. component of the voltage across said first resistor.

5. A generator as set forth in claim 4, wherein said regulating means comprises a differential amplifier having a positive terminal and a negative terminal, a second resistor inserted between said positive terminal and the connecting point of said first resistor and said secondary winding of said transformer, an inductance and a capacitor inserted in series with each other between said negative terminal and said connecting point of said first resistor and said secondary winding of said transformer, said inductance and said capacitor having values selected for forming a resonant circuit tuned to the frequency of the current produced by said self-oscillating circuit.

6. A generator as set forth in claim 1, wherein each stage of said adder-rectifier consists of two half-stages comprising each two capacitors and a diode inserted between said two capacitors, the two half-stages of each stage being interconnected by a resistor having a value of a few megohms.

7. A generator as set forth in claim 1, wherein said adder-rectifier comprises at least one printed-circuit plate having deposited on one face a conductive layer forming a common first plate for all the capacitors, separate conductive layers being deposited on the other face of said printed circuit plate for forming the respective second plates of said capacitors.

8. A generator as set forth in claim 7, wherein said adder-rectifier comprises, embedded in a block of molded resin or resin compound, two printed-circuit plates disposed in a parallel and spaced relationship to each other, the common first plates and the separate second plates of said capacitors being disposed respectively on the outer faces and on the inner faces of said printed circuit plates, the resistors and diodes being soldered directly to said second plates and being disposed between said two printed-circuit plates.

9. A generator as set forth in claim 1, wherein a protecting resistor having a value of 100 to 200 kiloohms per kilovolt of output voltage is inserted between the output of said adder-rectifier and the charge electrode of the electrostatic apparatus.

10. A generator as set forth in claim 9, wherein at least one diode is inserted between said protecting resistor and said charge electrode.

* * * * *